United States Patent
Chou et al.

(10) Patent No.: US 11,316,836 B2
(45) Date of Patent: *Apr. 26, 2022

(54) EFFICIENT SENSOR DATA DELIVERY

(71) Applicant: Daedalus Blue LLC, Bronxville, NY (US)

(72) Inventors: Wei-Ting Chou, Taipei (TW); Chih-Hsiung Liu, Taipei (TW); Hao-Ting Shih, Taipei (TW); Joey H. Y. Tseng, Taipei (TW)

(73) Assignee: Terrance Licensing LLC, Austin, TX (US)

( * ) Notice: Subject to any disclaimer, the term of this patent is extended or adjusted under 35 U.S.C. 154(b) by 302 days.

This patent is subject to a terminal disclaimer.

(21) Appl. No.: 16/453,130

(22) Filed: Jun. 26, 2019

(65) Prior Publication Data

US 2019/0319934 A1 Oct. 17, 2019

Related U.S. Application Data

(63) Continuation of application No. 15/654,223, filed on Jul. 19, 2017, now Pat. No. 10,367,790, which is a
(Continued)

(51) Int. Cl.
*H04L 29/06* (2006.01)
*H04L 51/00* (2022.01)
(Continued)

(52) U.S. Cl.
CPC .......... *H04L 63/0428* (2013.01); *H04L 51/12* (2013.01); *H04L 51/14* (2013.01);
(Continued)

(58) Field of Classification Search
CPC ... H04L 63/0428; H04L 63/10; H04L 63/123; H04L 51/12; H04L 51/14; H04L 67/12;
(Continued)

(56) References Cited

U.S. PATENT DOCUMENTS 7,249,356 B1 7/2007 Wilson
7,793,099 B2 9/2010 Peterson
(Continued)

FOREIGN PATENT DOCUMENTS

CN 101977361 A 2/2011
CN 103944977 A 7/2014

OTHER PUBLICATIONS

Alamri et al., "A Survey on Sensor-Cloud: Architecture, Applications, and Approaches", International Journal of Distributed Sensor Networks, vol. 2013, Article ID 917923, Hindawi Publishing Corporation, p. 1-18.
(Continued)

*Primary Examiner* — Minh Dinh
(74) *Attorney, Agent, or Firm* — Kinney & Lange, P.A.

(57) ABSTRACT

A method is provided to enhance efficiency of sensor event data transmission over network. Specifically, a method is described to buffer a set of sensor data, to group one or more of the set of sensor data having a same type for batch processing. The batch processing includes compressing and securing operations on the grouped sensor data and restoring the original message sequence of the grouped sensor data.

18 Claims, 11 Drawing Sheets

Related U.S. Application Data continuation of application No. 15/264,981, filed on Sep. 14, 2016, now Pat. No. 9,762,552, which is a continuation of application No. 15/015,171, filed on Feb. 4, 2016, now Pat. No. 9,473,514.

(51) Int. Cl.

| | | |
|---|---|---|
| *H04L 67/561* | (2022.01) | |
| *H04W 4/70* | (2018.01) | |
| *H04W 12/08* | (2021.01) | |
| *H04L 67/12* | (2022.01) | |
| *H04L 69/04* | (2022.01) | |

(52) U.S. Cl.
CPC ............ *H04L 63/123* (2013.01); *H04L 67/12* (2013.01); *H04L 67/2804* (2013.01); *H04L 69/04* (2013.01); *H04W 4/70* (2018.02); *H04W 12/08* (2013.01)

(58) Field of Classification Search
CPC . H04L 67/28; H04L 67/2804; H04L 67/2823; H04L 67/2828; H04L 69/04; H04W 12/08; H04W 4/70
See application file for complete search history.

(56) References Cited

U.S. PATENT DOCUMENTS

| | | |
|---|---|---|
| 9,473,514 B1 | 10/2016 | Chou |
| 9,762,552 B2 | 9/2017 | Chou |
| 2012/0158672 A1 | 6/2012 | Oltean |
| 2012/0197898 A1 | 8/2012 | Pandey |
| 2013/0097276 A1 | 4/2013 | Sridhar |
| 2013/0159418 A1 | 6/2013 | Jung |
| 2014/0275835 A1 | 9/2014 | Lamego |
| 2015/0227191 A1 | 8/2015 | Pitigoi-Aron |
| 2017/0317989 A1 | 11/2017 | Chou |

OTHER PUBLICATIONS

Ganesan et al., "Healthcare Monitoring Solution with Decryption Outsourcing by Parallel Computing in Cloud", Copyright © 2011 Research and Reviews, printed on Nov. 12, 2015, 12 pages, <http://www.rroij.com/open-access/healthcare-monitoring-solution-with-decryptionoutsourcing-by-parallel-computing-in-cloud.php?aid=47987>.

Gosalia, Manan, "Processing Amazon Kinesis Stream Data Using Amazon KCL for Node.js", Apr. 3, 2015, AWS Big Data Blog, 5 pages, <https://blogs.aws.amazon.com/bigdata/post/Tx18TQUE4BLLE5F/Processing-Amazon-Kinesis-Stream-Data-Using-Amazon-KCL-for-Node-js>.

Xu et al., "Optimizing Push/Pull Envelopes for Energy-Efficient Cloud-Sensor Systems", Conference '10, Month 1-2, 2010, Copyright 2010 ACM, 10 pages.

Korkmaz, Turgay, "Batch Forwarding in Wireless Sensor Networks", The 2010 Military Communications Conference—Unclassified Program—Networking Protocols and Performance Track, © 2010 IEEE, pp. 116-124.

Levin et al., "Message and time efficient multi-broadcast schemes", Ninth International Workshop on Foundations of Mobile Computing 2013 (FOMC 2013), EPTCS 132, 2013, pp. 21-37.

Mell et al., "The NIST Definition of Cloud Computing", National Institute of Standards and Technology, U.S. Department of Commerce, Special Publication 800-145, Sep. 2011, 7 pages.

N et al., "Medical Alert System for Remote Health Monitoring Using Sensors and Cloud Computing", IJRET: International Journal of Research in Engineering and Technology, vol. 03, Issue: 04| Apr. 2014, pp. 884-888.

IBM Appendix P.: List of IBM Patents or Patent Applications Treated as Related, Filed Herewith, 2 pages.

EFFICIENT SENSOR DATA DELIVERY

BACKGROUND

The present invention relates generally to the field of cloud computing, and more particularly to internet of things.

Generally speaking, cloud computing means storing and accessing data and programs over the Internet, that is, the on-demand delivery of IT resources and applications via the Internet with only pay for what you use. Cloud computing provides a way for enabling ubiquitous, convenient, on-demand network access to a shared pool of configurable computing resources (e.g., networks, servers, storage, applications and services) that can be rapidly provisioned and released with minimal management effort.

The Internet of Things (IoT) is a network of interconnected physical objects or "things." Those "things" are embedded with electronics, software, sensors, and network connectivity, which enables these objects to collect and exchange data, such that allowing "things" to be sensed and controlled remotely across existing network infrastructure. Each "thing" is uniquely identifiable through its embedded computing system, but is able to interoperate within the existing Internet infrastructure.

SUMMARY

In one aspect of the present invention, a method is provided comprising: identifying a batch of messages, each message of the batch of messages exhibiting a message pattern, the messages including sensor event data; associating batch metadata with the batch of messages, the batch metadata describing how the batch of messages is formatted; applying a security operation to the batch of messages to create a set of secured messages; updating the batch metadata with security operation information; and associating the updated batch metadata with the set of secured messages.

In another aspect of the present invention, a computer program product is provided comprising a computer readable storage medium having a set of instructions stored therein which, when executed by a processor, causes the processor to deliver messages by: identifying a batch of messages, each message of the batch of messages exhibiting a message pattern, the messages including sensor event data; associating batch metadata with the batch of messages, the batch metadata describing how the batch of messages is formatted; applying a security operation to the batch of messages to create a set of secured messages; updating the batch metadata with security operation information; and associating the updated batch metadata with the set of secured messages.

In yet another aspect of the present invention, a computer system is provided comprising: a processor set; and a computer readable storage medium; wherein: the processor set is structured, located, connected, and/or programmed to run program instructions stored on the computer readable storage medium; and the program instructions which, when executed by the processor set, cause the processor set to deliver messages by: identifying a batch of messages, each message of the batch of messages exhibiting a message pattern, the messages including sensor event data; associating batch metadata with the batch of messages, the batch metadata describing how the batch of messages is formatted; applying a security operation to the batch of messages to create a set of secured messages; updating the batch metadata with security operation information; and associating the updated batch metadata with the set of secured messages

DETAILED DESCRIPTION

Figure 1:
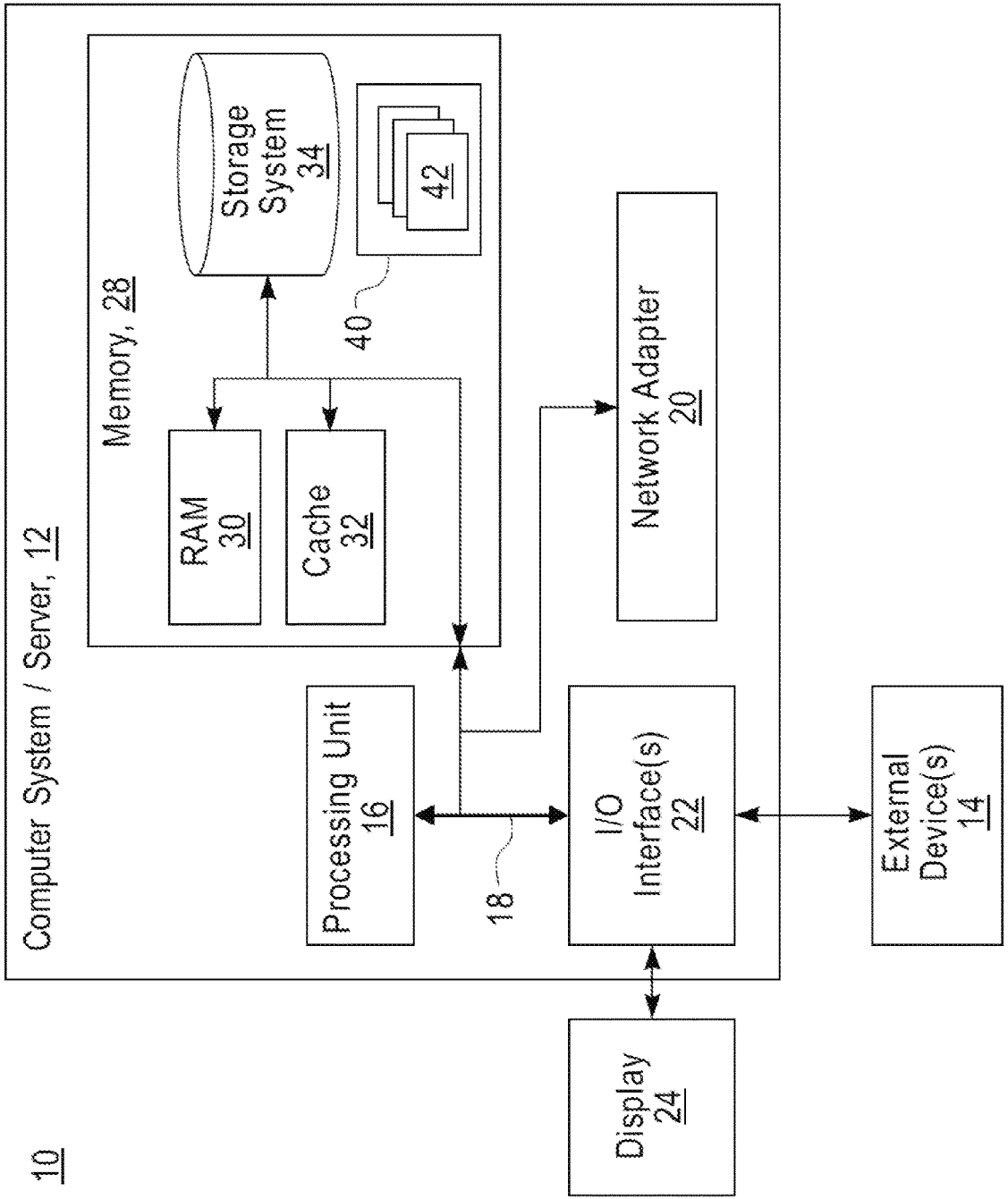
FIG. 1 depicts a cloud computing node used in a first embodiment of a system according to the present invention.

A method is provided to enhance efficiency of sensor event data transmission over network. Specifically, a way is described to buffer the sensor data, to group sensor data of the same type for batch processing including the compressing and securing operations, and to restore the original message sequence of sensor data. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
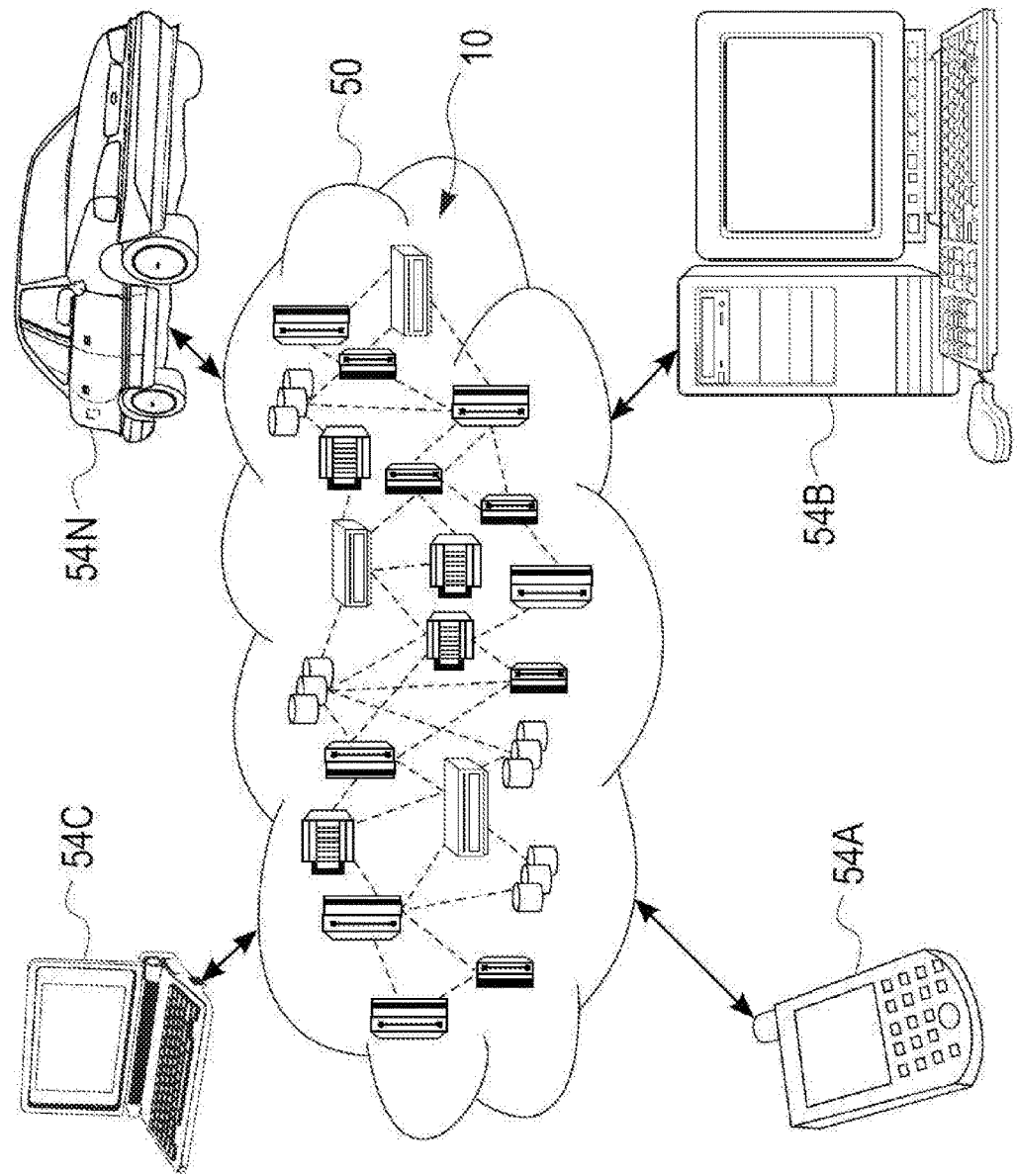
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
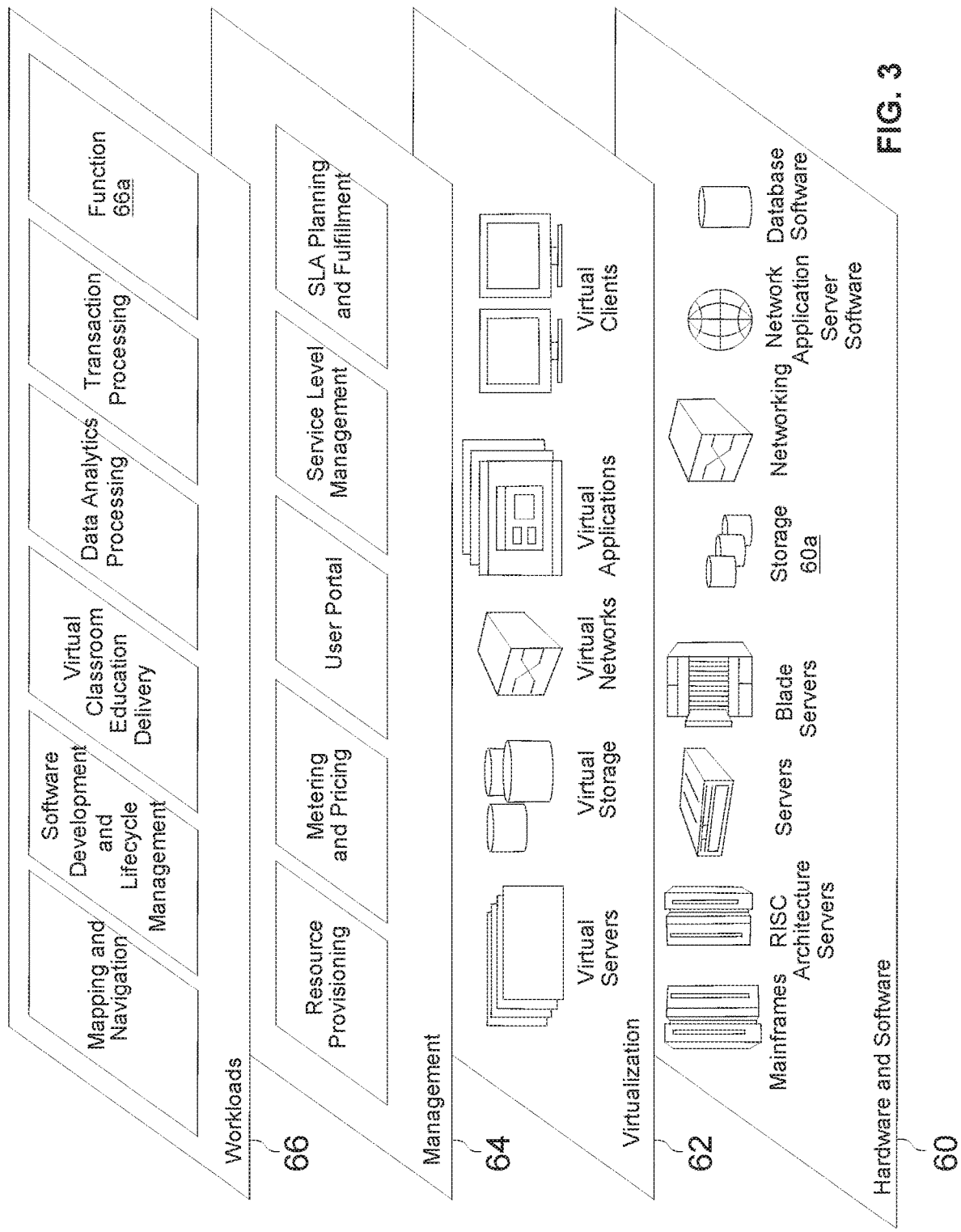
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a).

While a cloud-based system is described above, additional embodiments of the present invention may be practiced in a traditional networked computer systems, as described in detail below with respect to FIGS. 4-7.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 4:
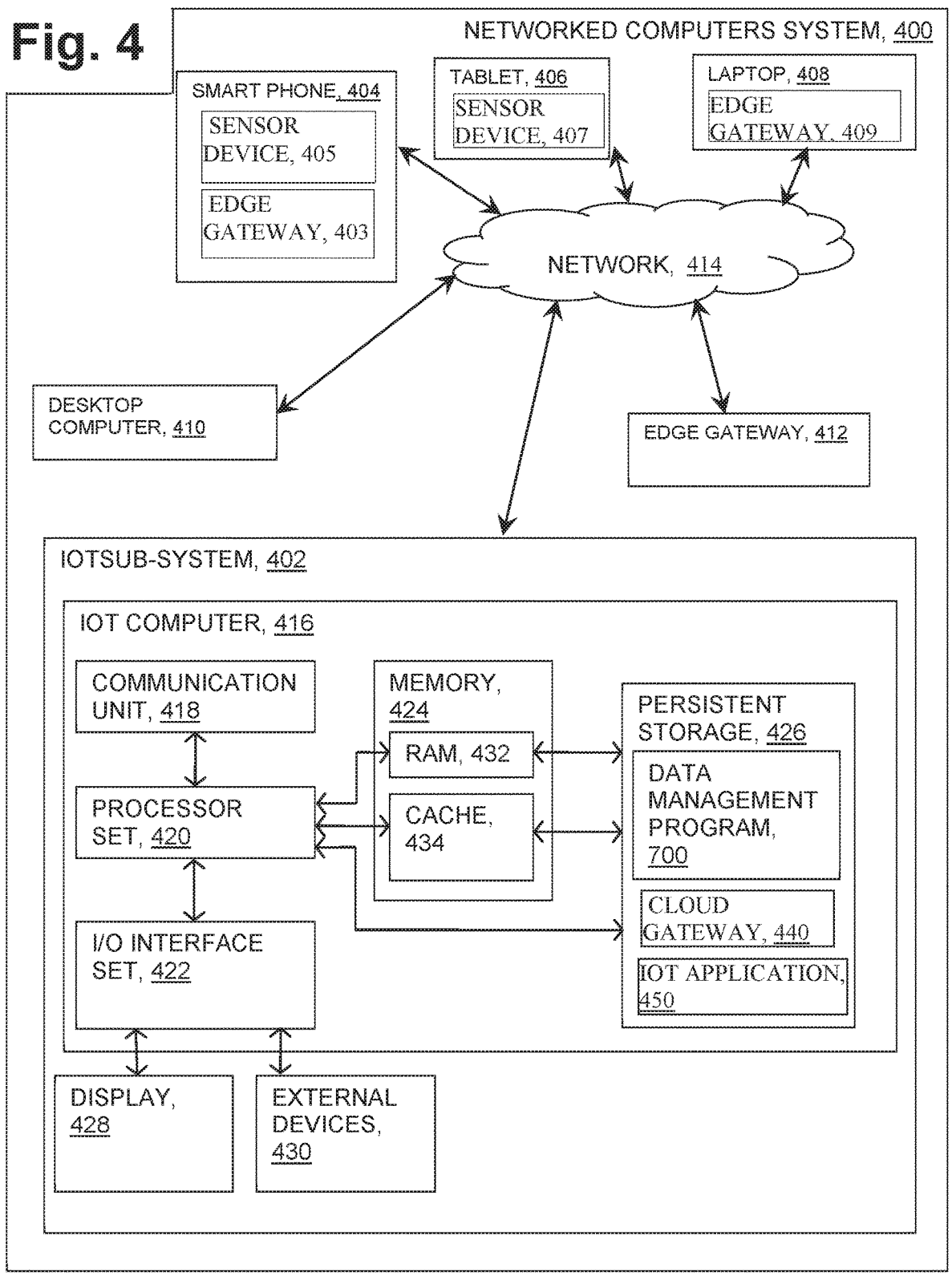
FIG. 4 is a schematic view of a second embodiment of a system according to the present invention.

Some embodiments of the present invention will now be described in detail with reference to the Figures. FIG. 4 is a functional block diagram illustrating various portions of networked computers system 400, in accordance with one embodiment of the present invention, including: Internet of things (IOT) sub-system 402; smart phone 404; sensor device 405; edge gateway 403; tablet 406; sensor device 407; laptop 408; edge gateway 409; desktop computer 410; edge gateway 412; communication network 414; IOT computer 416; communication unit 418; processor set 420; input/output (I/O) interface set 422; memory device 424; persistent storage device 426; display device 428; external device set 430; random access memory (RAM) devices 432; cache memory device 434; data management program 700; cloud gateway 440; and IOP application 450.

Sub-system 402 is, in many respects, representative of the various computer sub-system(s) in the present invention. Accordingly, several portions of sub-system 402 will now be discussed in the following paragraphs.

Sub-system 402 may be a laptop computer, tablet computer, netbook computer, personal computer (PC), a desktop computer, a personal digital assistant (PDA), a smart phone, or any programmable electronic device capable of communicating with the client sub-systems via network 414. Program 700 is a collection of machine readable instructions and/or data that is used to create, manage, and control certain software functions that will be discussed in detail below.

Sub-system 402 is capable of communicating with other computer sub-systems via network 414. Network 414 can be, for example, a local area network (LAN), a wide area network (WAN) such as the Internet, or a combination of the two, and can include wired, wireless, or fiber optic connections. In general, network 414 can be any combination of connections and protocols that will support communications between server and client sub-systems.

Sub-system 402 is shown as a block diagram with many double arrows. These double arrows (no separate reference numerals) represent a communications fabric, which provides communications between various components of sub-system 402. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 424 and persistent storage 426 are computer readable storage media. In general, memory 424 can include any suitable volatile or non-volatile computer readable storage media. It is further noted that, now and/or in the near future: (i) external device(s) 430 may be able to supply, some or all, memory for sub-system 402; and/or (ii) devices external to sub-system 402 may be able to provide memory for sub-system 402.

Program 700 is stored in persistent storage 426 for access and/or execution by one or more of the respective computer processors 204, usually through one or more memories of memory 424. Persistent storage 426: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 426. Alternatively, program 700 operates in a cloud computing environment and is stored, for example, in storage 60*a* (FIG. 3) within hardware and software layer 60 of cloud computing environment 50.

Program 700 may include both machine readable and performable instructions, and/or substantive data (that is, the type of data stored in a database). In this particular embodiment, persistent storage 426 includes a magnetic hard disk drive. To name some possible variations, persistent storage 426 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 426 may also be removable. For example, a removable hard drive may be used for persistent storage 426. Other examples include optical and magnetic disks, thumb drives, and smart cards that are inserted into a drive for transfer onto another computer readable storage medium that is also part of persistent storage 426.

Communications unit 418, in these examples, provides for communications with other data processing systems or devices external to sub-system 402. In these examples, communications unit 418 includes one or more network interface cards. Communications unit 418 may provide communications through the use of either, or both, physical and wireless communications links. Any software modules discussed herein may be downloaded to a persistent storage device (such as persistent storage device 426) through a communications unit (such as communications unit 418).

I/O interface set 422 allows for input and output of data with other devices that may be connected locally in data communication with computer 416. For example, I/O interface set 422 provides a connection to external device set 430. External device set 430 will typically include devices such as a keyboard, keypad, a touch screen, and/or some other suitable input device. External device set 430 can also include portable computer readable storage media such as, for example, thumb drives, portable optical or magnetic disks, and memory cards. Software and data used to practice embodiments of the present invention, for example, program 600, can be stored on such portable computer readable storage media. In these embodiments the relevant software may (or may not) be loaded, in whole or in part, onto persistent storage device 426 via I/O interface set 422. I/O interface set 422 also connects in data communication with display device 428.

Display device 428 provides a mechanism to display data to a user and may be, for example, a computer monitor or a smart phone display screen.

Data management program 700 operates to rearrange sensor event sequences based on event data similarity, compress the rearranged event data, and apply batch security operation on compressed sequential event data. Event rearrangement facilitates data compression rate. Further, program 700 wrap the events that have be batch processed with a new event (i.e., SEW, Sensor Event Wrapper). SEW contains the metadata of the wrapped event data. Further, when received the SEW by a cloud gateway (e.g., cloud gateway 440), program 700 facilitates the cloud gateway to retrieve the original sensor event sequences by performing corresponding security operations (e.g. decrypt and verify), decompression, and rearrangement of the decompressed event data. Program 700 may run on a computer server (e.g., IOT computer 416 in FIG. 4), and/or on one or more computers (e.g., smart phone 404, tablet 406, laptop 408, desktop 410 and edge gate 412 in FIG. 4).

Some embodiments of the present invention recognize the following facts, potential problems and/or potential areas for improvement with respect to the current state of the art: (i)

the workload pattern for IoT application is a huge amount of small size payload to be transmitted in a short period of time; (ii) It is inefficient to process sensor data individually prior to delivering the sensor data to a cloud application due to, for example, transport protocol overhead; (iii) the sensor data need to be encrypted, and maybe signed, before it could be transmitted over insecure internet, but security operations are expensive; and/or (iv) IoT is expected to generate large amounts of data from diverse locations that is aggregated very quickly, thereby increasing the need to better index, store and process such data.

With the rapid growth of connected devices, the number of sensor events generated increased at a huge rate. These sensor events are collected by edge devices (e.g. mobile phone, smart home controller) and transmit to the cloud using standard protocols, for example HTTP (hypertext transfer protocol), MQTT (message queuing telemetry transport), and AMQP (advanced message queuing protocol). However, these protocols do not provide an efficient data delivery mechanism that is optimized for the sensor event data, thus unnecessary bandwidth and computing power of edge device is consumed. Further, inefficient data delivery over Internet would cause long latency and congestion, especially for some protocols that employ retry mechanism.

Further, security is another important aspect of the cloud-based IoT applications. The sensor data need to be encrypted, and maybe signed, before it could be transmitted over insecure Internet. However, it is very inefficient to apply security operation on individual sensor event, especially for some edge device that has limited computing power.

Figure 5:
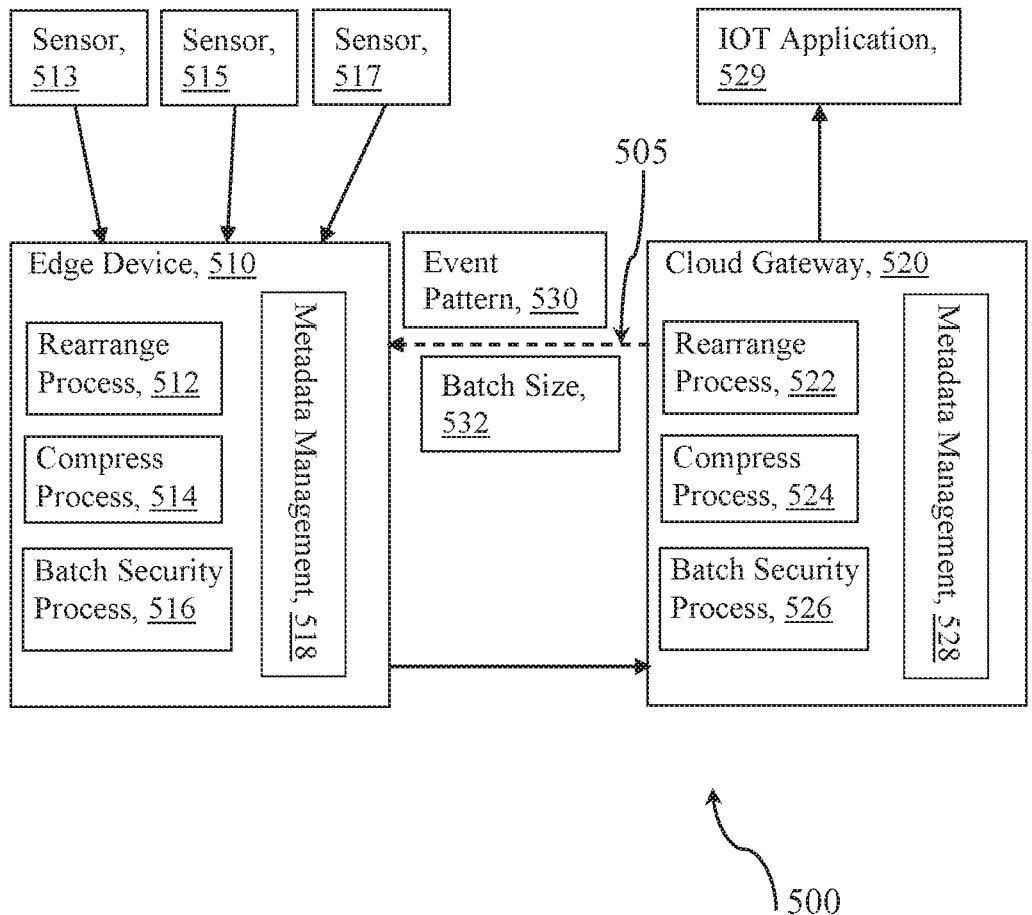
FIG. 5 is a schematic view of a third embodiment of a system according to the present invention.

To address these concerns, some embodiments of the present invention describe a mechanism to deliver sensor events securely and efficiently, as shown in FIG. 5. FIG. 5 is a schematic view of system flow 500 according to the present invention. In some embodiments, the system components of system 400 participate in system flow 500; however, in this example, separate component numbering is used in describing system flow 500. The server side (i.e., cloud gateway 520) recognizes message patterns (event pattern 530) and sends the pattern to client side edge component (edge device 510) through command channel 505 represented by the dotted line. The edge component keeps a dynamic adjustable buffer of message (batch size 532 that is sent by cloud gate 520). By checking received messages (collected from sensors 513, 515, and 517) against message patterns, the client side edge device reorganizes, through rearrange process 512, the received messages so that messages with the same pattern are grouped to form a batch. After compressing the grouped messages through compress process 514, security operations are applied to the grouped messages (batches) through batch security process 516 and a secure data batch (SDB) is generated. The SDB is then sent to the cloud endpoints/gateway as indicated by the solid-line arrow directing from the edge device 510 to cloud gateway 520. Further, metadata management 518 generates and updates metadata associated with the grouped message, the compressed batch message, and the secured batch message. When receiving the SDB, the cloud gateway 520 reads batch metadata through metadata management 528 and applies the reverse process through rearrange process 522, compress process 524, and batch security process 526 to generate an original sensor event data sequence. The original sensor event data are delivered to IOT application 529 by cloud gateway 520 as indicated by the solid-line arrow directing from cloud gateway 520 to IOT application 529.

Alternatively, the edge component is a library (e.g. SDK (software development kits)) that allow an edge device to send sensor data to a cloud environment conveniently. The library contains the knowledge of how to perform batch processing, compressing and crypto operations for the sensor event data.

Figure 6:
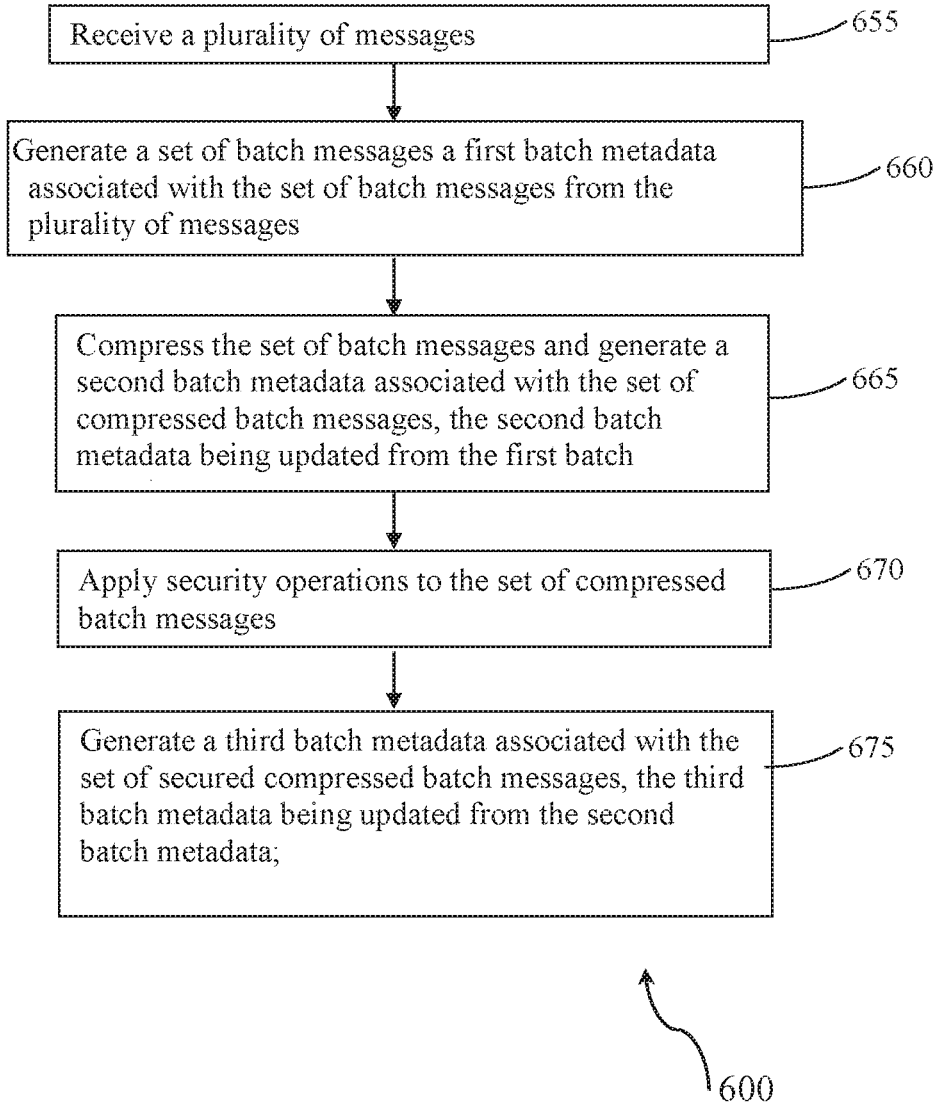
FIG. 6 is a flowchart showing a method performed, at least in part, by the second embodiment system.
Figure 7:
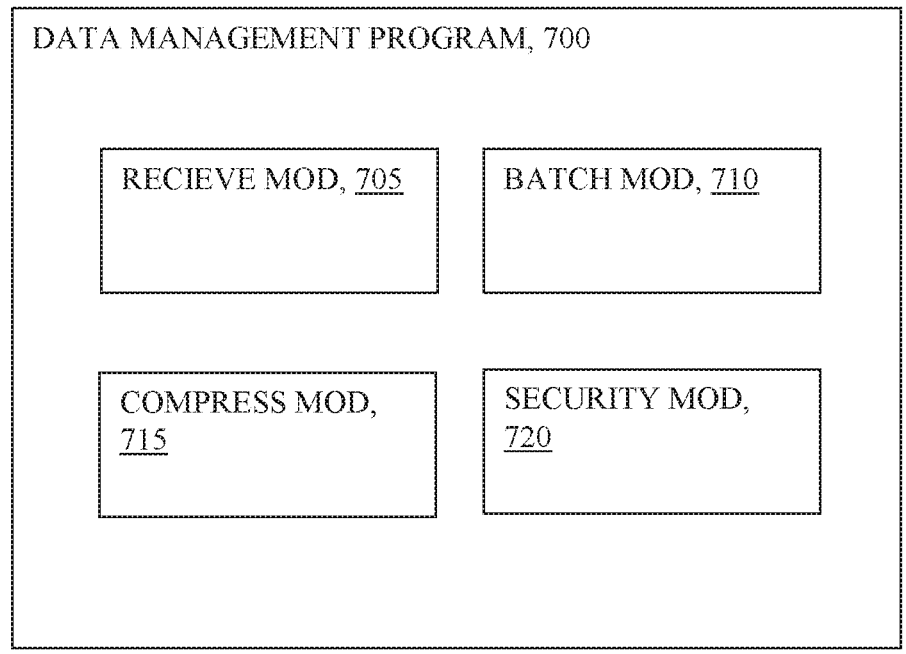
FIG. 7 is a schematic view of a machine logic (for example, software) portion of the second embodiment system.

Referring now to FIG. 6, flowchart 600 depicts a first method according to the present invention. FIG. 7 shows program 700 for performing at least some of the method steps of flowchart 600.

Processing begins at step 655, where receive module "mod" 705 receives a plurality of messages. The plurality of messages may be sensor event data messages generated by sensor devices. For example, an IOT application monitors various vital sign event with wearable devices. The events are transmitted to a cloud-based health monitoring application via a mobile device. Thus, in this case, the wearable device is the sensor event generator, and the mobile device is the edge device. In this example, the sensor device 405 is located on smart phone 404. Smart phone 404 as a sensor message collecting device (edge device) receives a plurality of sensor data messages generated by sensor device 405. Alternatively, the sensor device is a standalone device that is separately from sensor message receiving device (e.g., laptop 408, desktop computer 410). Further, the message buffer size on an edge device is dynamically adjustable to receive sensor data messages. The buffers size may be defined by the server based on its work load, such as IOT computer 416.

Processing proceeds to step 660, where rearrange module 710 generates a set of batch messages and a first batch metadata associated with the set of batch messages from the plurality of messages. Generally, the sensor events collected from various sensor devices do not follow the same event format. Below are two examples of sensor event messages having different message format/pattern. Message pattern is defined herein as a sequence of messages from the same source with very similar format.

EXAMPLE 1

```
"Event A : heart-rate event"
{
  "device_id" : "12345",
  "user" : "alice",
  sensor_events: {
    "heart-rate" : 93,
    "timestamp" : "20150415 09:15:02"
  }
}
```

EXAMPLE 2

```
" Event B : blood_pressure event"
{
  "device_name" : "blood_pressure_detector",
  "user_firstname" : "alice",
  "user_lastname" : "wang"
  "time" : "20150415 09:30:22"
  "blood_pressure" : 140
}
```

When receiving the sensor event messages, the messages are grouped into a set of batched messages based on the same message pattern. That is, the sequence of the received original sensor event messages may be changed and rearranged such that the messages having the same message pattern are grouped together to form a message batch. Such grouping and/or rearrangement facilitate compression and the following data tokenization of event messages. Namely, by grouping related events together, the compression rate and the following tokenization of event messages could be done much more efficient. Further, a first batch metadata is generated for the set of batched messages. For example, the metadata describes how and when and by whom the set of batch message is collected, and how the set of batch message is formatted. Further, based on different policies, some events may be eliminated during the rearrangement process of edge device and restored on the cloud sever side.

In some embodiments of the present invention, the knowledge of message pattern is learned, or acquired, from the cloud gateway site (e.g., cloud gateway 440), where the cloud gateway gradually identifies pattern of specific event (e.g. some event could be identified by the "topic" it associated with, or some event may be identified by the data field it contains).

In some embodiments of the present invention, the grouping and/or rearrangement process is performed on an edge gateway. For example, edge gateway 403 located on smartphone 404. Alternatively, edge gateway may be a standalone device that is separate from the edge device, such as edge gateway 412, and tablet 406 and desktop 410 do not have an installed/built-in edge gateway.

Processing proceeds to step 665, where compress module 715 compresses the set of batch messages and generate a second batch metadata associated with the set of compressed batch messages. In this example, the set of batch messages is compressed to reduce the size of the message to facilitate the transfer of the set of batch messages over the network. The compression methods may ben any suitable compression method. Further, a second batch metadata is created by updating the first batch metadata to reflect the compression information.

Processing proceeds to step 670, where security module 720 applies security operations to the set of compressed batch messages. In this example, security operations are applied to the grouped message (batch messages) and generate a secure data batch.

The batch security process performs two things: data tokenization and batch crypto operation. For efficient sensor event data transmission, some data field and value of the sensor event are replaced by pre-defined tokens defined in tokenization dictionary. The dictionary is created and gradually enhanced on the cloud (cloud gateway 440) and then synchronized to the edge device (smart phone 404) periodically. On the edge device, the sensor data received are first replaced with tokens before further processing. Sensor data in a batch are grouped together in a multipart format before applying crypto operations.

Processing ends at step 675, where security module 720 generates a third batch metadata associated with the set of secured compressed batch messages. In this example, the third batch metadata is updated from the second batch metadata to containing information about the security operations. One example of the third batch metadata is shown below, such batch metadata describes the receiving sequence of the sensor events and the operations applied to the events.

```
{
    Batch 1:{
        events:
        [{
            id: 1,
            original_sequence: 3,
        }, {
            Id: 2,
            Original_sequence: 6,
        }, {
            Id: 3,
            Original_sequence: 7,
            Skip: true
        }
        ],
        Type: 'humidity',
        Operations: [compress, encrypt, sign]
    },
    Batch2: {
        events:
        [{
            id: 1,
            original_sequence: 1,
        }, {
            Id: 2,
            Original_sequence: 2,
        }, {
            Id: 3,
            Original_sequence: 4,
            Skip: true
        }
        ],
        Type: 'temperature',
        Operations: [compress, encrypt, sign]
    },
    Event:{
        Type: 'others',
        Original_sequence: 5,
    }
    Batch_window: 7,
    Checksum:xooooooox
}
```

In the above batch metadata, the batch window is 7, that is, the message buffer size is 7, so the maximum sensor events the edge device can receive one time is seven messages as shown for the original sequence. The event type shown above is humidity, temperature, and others, respectively.

Figure 8:
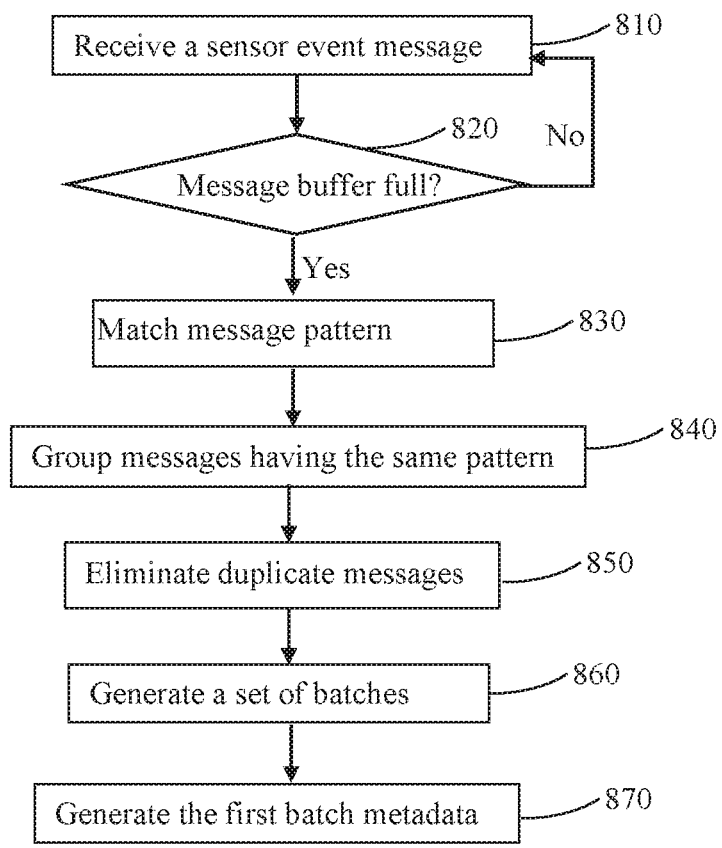
FIG. 8 is a flowchart showing a method for performing receiving and rearrangement of sensor event messages.

FIG. 8 shows a flowchart describing receiving and rearranging the plurality of sensor event messages on the edge device 404 according to one embodiment of the present invention. At step 810, the edge device receives a sensor event message generated by a sensor device, and add the sensor event message to a message buffer. At step 820, the message buffer is determined to whether it is full. If not full, sensor event messages continue to be added to the message buffer till it reaches the buffer limit. Then the messages in the message buffer are matched with available message patterns at step 830. At step 840, the messages having the same message pattern are grouped together. Further at step 850, any duplicate message in the grouped messages is eliminated to generate a set of batches at step 860. Further at step 870 the first batch metadata is generated to describe information about the set of batch messages.

Figure 9:
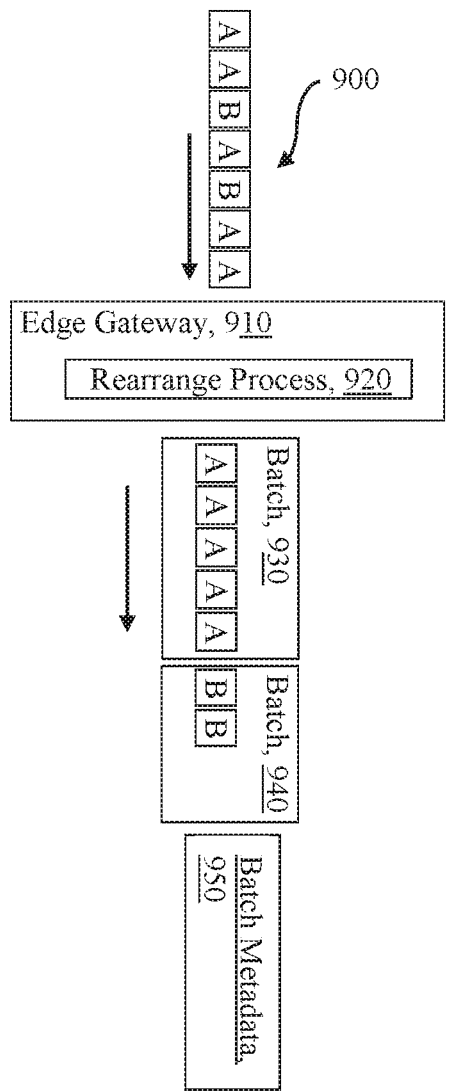
FIG. 9 is an example of generating a set of batch messages from a plurality of original sensor event messages.

FIG. 9 shows a schematic view of one example of the sensor event messages before and after the arrangement process of the edge device. In this example, the sequence of the sensor event messages received by edge gateway 910 is shown as indicated by 900 and the solid arrow directing into edge gateway 910. Herein, the sensor event A may be humidity sensor events, and the sensor event B may be temperature sensor events that have a different message pattern from the sensor event A. After message pattern matching and grouping through rearrange process 920, batch 930 is formed having only the sensor events A and batch 940 is formed having only the sensor events B, as shown by the solid line arrow coming out of edge gateway 910. Further, batch metadata 950 as a first batch metadata is generated to describe batches 930 and 940. Alternatively, instead of generating batch metadata 950 describing both batch 930 and batch 940, batch 930 and batch 940 may have its own batch metadata that is contained in batch 930 and batch 940, respectively.

Figure 10:
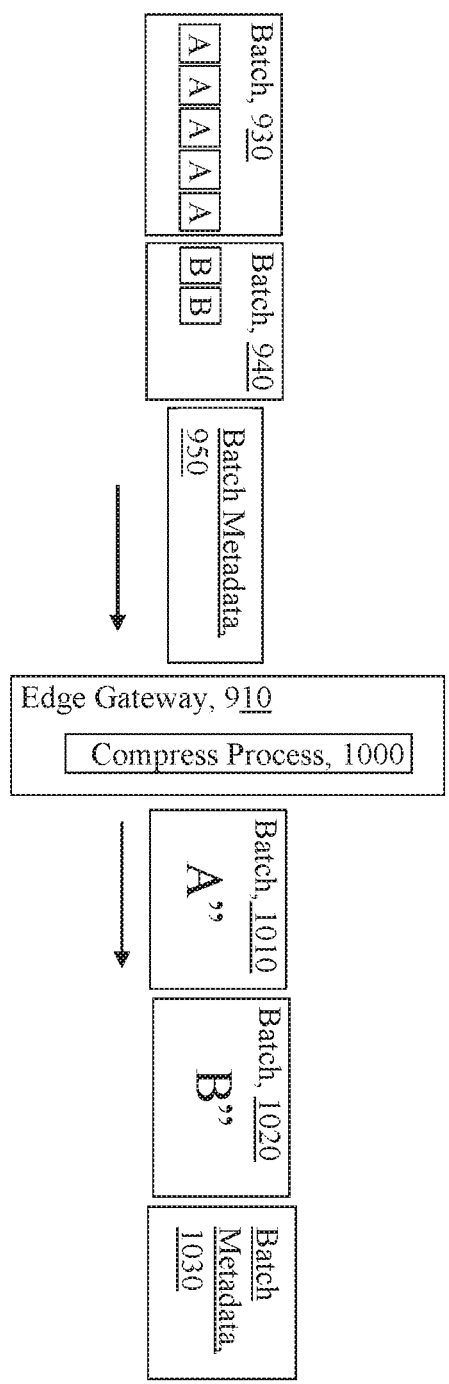
FIG. 10 is an example of generating a set of compressed batch messages from the set of batch messages in FIG. 9.

FIG. 10 shows a schematic view of one example of a set of batch messages before and after the compress process of the edge device. In this example, batches 930 and 940, as well as batch metadata 950 are input into compress process 1000 on edge gateway 910, as shown by a solid arrow directing into edge gateway 910. After being compressed through compress process 1000 as shown by the solid line arrow coming out of edge gateway 910, batch 930 becomes compressed batch 1010 as shown by A" representing compressed events A, and batch 940 becomes compressed batch 1020 as shown by B" representing compressed events B, Further, batch metadata 1030 as a second batch metadata is generated by updating batch metadata 950 to reflect compression information applied to batches 930 and 940. Alternatively, instead of generating batch metadata 1030 describing both batch 1010 and batch 1020, batch 1010 and batch 1020 may have its own batch metadata that is contained in batch 1010 and batch 1020, respectively.

Figure 11:
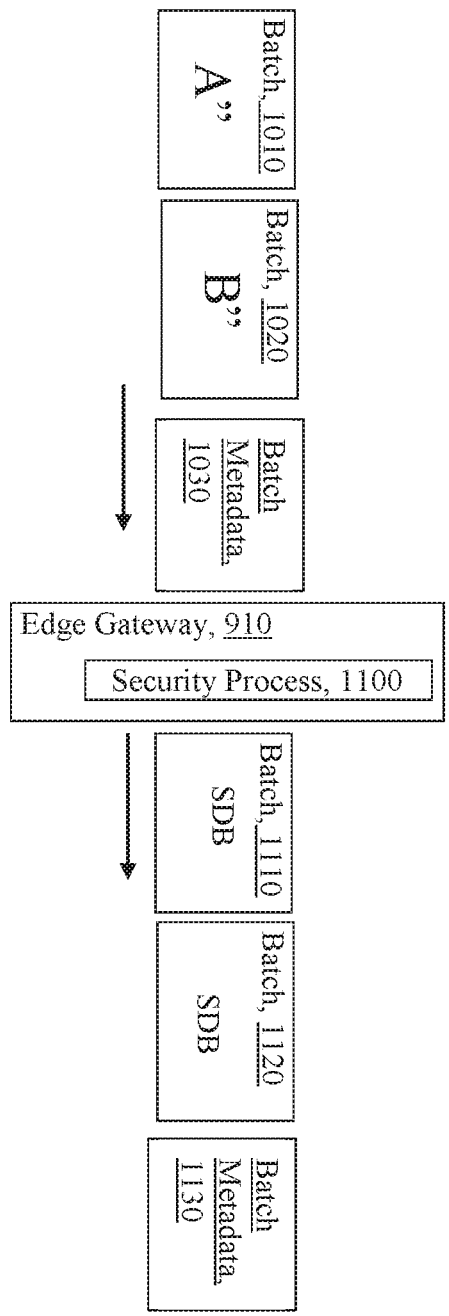
FIG. 11 is an example of generating a set of secure batch messages from the set of compressed batch messages in FIG. 10.

FIG. 11 shows a schematic view of one example of the set of compressed batch messages before and after the security process of the edge device. In this example, batches 1010 and 1020, as well as batch metadata 1030 are input into security process 1100 on edge gateway 910, as shown by a solid arrow directing into edge gateway 910. After being applied security operations through security process 1100 as shown by the solid line arrow coming out of edge gateway 910, batch 1010 becomes secure batch 1110 as shown by SDB representing secure data batch and batch 1020 becomes secure batch 1120 as shown by SDB representing secure data batch. Further, batch metadata 1130 as a third batch metadata is generated by updating batch metadata 1030 to reflect security operations information applied to batches 1010 and 1020. Alternatively, instead of generating batch metadata 1130 describing both batch 1110 and batch 1120, batch 1110 and batch 1120 may have its own batch metadata that is contained in batch 1110 and batch 1120, respectively.

Further, the set of secured batch of messages are transmitted from edge gateway (e.g. smart phone 404) to cloud gateway (e.g., cloud gateway 440) over network. Upon receiving the secured batch of messages, the cloud gateway identifies the third batch metadata and applies the reverse processes to generate the original sequence of the sensor event messages, thus the original sequence of the sensor event messages first received by the edge device is maintained on the receiving server side. The restored sensor event messages are further sent to an application for analysis (IOT application 450). Specifically, the cloud gateway retrieves the set of compressed batch messages and the second batch metadata from the set of secured compressed batch messages and the third batch metadata by reversing the security process; retrieves the set of batch messages and the first batch metadata from the set of compressed batch message and the second batch metadata by reversing the compress process (i.e., decompress the compressed messages); and retrieves the plurality of messages from the set of batch messages and the first batch metadata by reversing the rearrange process. During all these reversing processes, metadata facilitates the cloud gateway to generate the original events after applying corresponding operations.

Some embodiments of the present invention may include one, or more, of the following features, characteristics and/or advantages: (i) from IoT application perspective, the underlying sensor event data delivery mechanism is transparent and the event data always arrive in order; (ii) the sensor event data delivery process is optimized when an edge device tries to push events to a cloud platform; (iii) sensor events are grouped and batch processed before sending to cloud applications; (iv) the batch sensor events are wrapped with secure, multipart payload (e.g. SMIME, secure multipurpose internet mail extensions); (v) a channel exists for passing sensor event messaging patterns, acknowledgement, and other optimization parameters; (vi) the batching feature of the present invention may easily integrate with a real time analytic framework; and/or (vii) a new category of IoT gateway is created for secure and optimal delivery of sensor events.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
   identifying a batch of messages, each message of the batch of messages exhibiting a message pattern, the messages including sensor event data;
   associating batch metadata with the batch of messages, the batch metadata describing how the batch of messages is formatted;
   applying a security operation to the batch of messages to create a set of secured messages;
   updating the batch metadata with security operation information; and
   associating the updated batch metadata with the set of secured messages.

2. The method of claim 1, further comprising:
   setting a message buffer for receiving a plurality of messages, the message buffer having an adjustable size; and
   generating from the plurality of messages the batch of messages exhibiting the message pattern.

3. The method of claim 1, further comprising:
   determining the message pattern;
   identifying a set of messages having the message pattern; and
   generating the batch of messages from the set of messages.

4. The method of claim 1, wherein applying the security operation to the batch of messages includes:
- replacing a data field and an associated value of messages in the batch of messages with a token to create a set of tokenized messages; and
- applying cryptographic operations to the set of tokenized messages.

5. The method of claim 1, further comprising:
compressing the batch of messages.

6. The method of claim 1, further comprising:
- transmitting the set of secured messages and the updated batch metadata to an application; and
- retrieving a message from the set of secured messages and batch metadata corresponding to the message.

7. A computer program product comprising a computer-readable storage medium having a set of instructions stored therein which, when executed by a processor, causes the processor to associate metadata with a set of secured messages by:
- identifying a batch of messages, each message of the batch of messages exhibiting a message pattern, the messages including sensor event data;
- associating batch metadata with the batch of messages, the batch metadata describing how the batch of messages is formatted;
- applying a security operation to the batch of messages to create a set of secured messages;
- updating the batch metadata with security operation information; and
- associating the updated batch metadata with the set of secured messages.

8. The computer program product of claim 7, further causing the processor to associate metadata with a set of secured messages by:
- setting a message buffer for receiving a plurality of messages, the message buffer having an adjustable size; and
- generating from the plurality of messages the batch of messages exhibiting the message pattern.

9. The computer program product of claim 7, further causing the processor to associate metadata with a set of secured messages by:
- determining the message pattern;
- identifying a set of messages having the message pattern; and
- generating the batch of messages from the set of messages.

10. The computer program product of claim 7, wherein applying the security operation to the batch of messages includes:
- replacing a data field and an associated value of messages in the batch of messages with a token to create a set of tokenized messages; and
- applying cryptographic operations to the set of tokenized messages.

11. The computer program product of claim 7, further causing the processor to associate metadata with a set of secured messages by:
compressing the batch of messages.

12. The computer program product of claim 7, further causing the processor to associate metadata with a set of secured messages by:
- transmitting the set of secured messages and the updated batch metadata to an application; and
- retrieving a message from the set of secured messages and batch metadata corresponding to the message.

13. A computer system comprising:
- a processor set; and
- a computer readable storage medium;

wherein:
- the processor set is structured, located, connected, and/or programmed to run program instructions stored on the computer readable storage medium; and
- the program instructions which, when executed by the processor set, cause the processor set to associate metadata with a set of secured messages by:
  - identifying a batch of messages, each message of the batch of messages exhibiting a message pattern, the messages including sensor event data;
  - associating batch metadata with the batch of messages, the batch metadata describing how the batch of messages is formatted;
  - applying a security operation to the batch of messages to create a set of secured messages;
  - updating the batch metadata with security operation information; and
  - associating the updated batch metadata with the set of secured messages.

14. The computer system of claim 13, further causing the processor to associate metadata with a set of secured messages by:
- setting a message buffer for receiving a plurality of messages, the message buffer having an adjustable size; and
- generating from the plurality of messages the batch of messages exhibiting the message pattern.

15. The computer system of claim 13, further causing the processor to associate metadata with a set of secured messages by:
- determining the message pattern;
- identifying a set of messages having the message pattern; and
- generating the batch of messages from the set of messages.

16. The computer system of claim 13, wherein applying the security operation to the batch of messages includes:
- replacing a data field and an associated value of messages in the batch of messages with a token to create a set of tokenized messages; and
- applying cryptographic operations to the set of tokenized messages.

17. The computer system of claim 13, further causing the processor to associate metadata with a set of secured messages by:
compressing the batch of messages.

18. The computer system of claim 13, further causing the processor to associate metadata with a set of secured messages by:
- transmitting the set of secured messages and the updated batch metadata to an application; and
- retrieving a message from the set of secured messages and batch metadata corresponding to the message.

* * * * *